US008554077B2

(12) United States Patent
Ghazisaidi (10) Patent No.: US 8,554,077 B2
(45) Date of Patent: Oct. 8, 2013

(54) ENERGY EFFICIENCY AND COST EFFICIENT PROTECTION IN PASSIVE OPTICAL NETWORKS

(75) Inventor: Navid Ghazisaidi, San Jose, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 258 days.

(21) Appl. No.: 13/185,289

(22) Filed: Jul. 18, 2011

(65) Prior Publication Data

US 2013/0022356 A1 Jan. 24, 2013

(51) Int. Cl.
*H04B 10/20* (2006.01)

(52) U.S. Cl.
USPC .......................................................... 398/67

(58) Field of Classification Search
USPC .................................................. 398/66–67
See application file for complete search history.

(56) References Cited

U.S. PATENT DOCUMENTS

2012/0051748 A1    3/2012  Hotta et al.
2012/0166819 A1*   6/2012  Skubic et al. ................. 713/300

FOREIGN PATENT DOCUMENTS

EP          1933477      6/2008
WO     WO-2011007423     1/2011

OTHER PUBLICATIONS

Cicconetti, C., et al., "Reducing Power Consumption with QoS Constraints in IEEE 802.1e Wireless Networks", *IEEE Transactions on Mobile Computing*, vol. 9, No. 7, Jul. 2010, pp. 1008-1021.

Cristensen, K., et al., "IEEE 802.3az: The Road to Energy Efficient Ethernet", *IEEE Communications Magazine*, vol. 48 No. 11, pp. 2-8, Nov. 2010.

Effenberger, Frank J., et al., "Advances in Broadband Passive Optical Networking Technologies", *IEEE Communications Magazine*, vol. 39, No. 12, pp. 118-124, Dec. 2001.

Ghazisaidi, N., et al., "Frame aggregation in fibre-wireless (FiWi) broadband access networks", *Electronics Letters*, vol. 46, No. 5, pp. 377-379, Mar. 2010.

Ghazisaidi, N., et al., "Prototype Development of Advanced Hierarchical Frame Aggregation in Fibre-Wireless Access Networks", *Electronics Letters*, vol. 47, No. 2, pp. 124-126, Jan. 2011.

Kim, R. Y., et al., "Advanced Power Management Techniques in Next-Generation Wireless Networks", *IEEE Communications Magazine*, vol. 48, No. 5, pp. 94-102, May 2010.

Kim, G., et al., "An Adjustable Power Mangement for Optimal Power Saving in LTE Terminal Baseband Modem", *IEEE Transactions on Consumer Electronics*, vol. 55, No. 4, pp. 1847-1853, Nov. 2009.

(Continued)

*Primary Examiner* — Leslie Pascal
(74) *Attorney, Agent, or Firm* — Blakely, Sokoloff, Taylor & Zafman (57) ABSTRACT

A network element implementing an optical network unit (ONU) that is configured to improve efficiency in a passive optical network (PON), the ONU connected to an optical line terminal (OLT) over an optical line, the ONU connected with an aggregating ONU (AG-ONU) in the PON through an alternate connection separate from the PON, the ONU improving protection (maintenance) cost and energy efficiency for the PON by entering a sleep mode that disables communication with the OLT over the optical line to reduce energy consumption when the ONU is idle, the ONU to restart communication with the OLT over the optical line upon receipt of data traffic, the ONU including an alternate connection module configured to communicate with the AG-ONU; and a network processor configured to execute a quality of service module, an AG-ONU monitor module, a traffic forwarding module and a power management module.

17 Claims, 6 Drawing Sheets

(56) References Cited

OTHER PUBLICATIONS

Koonen, Ton, "Fiber to the Home/Fiber to the Premises: What, Where, and When?", *Proceedings of the IEEE*, vol. 94, No. 5, pp. 911-934, May 2006.

Kubo, Ryogo, et al., "Sleep and Adaptive Link Rate Control for Power Saving in 10G-EPON Systems", in *Proc., IEEE Global Telecommunications Conference (GLOBECOM)*, Honolulu, HI, pp. 1-6, Nov.-Dec. 2009.

Kubo, R., "Study and Demonsration of Slep and Adaptive Link Rate Control Mechanisms for Energy Effiient 10G-EPON", *IEEE/OSA Journal of Optical Communications and Networking*, vol. 2, No. 9, pp. 716-779, Sep. 2010.

Lange, C., et al., "On Energy Consumption of Telecommunication Networks—A Network Operator's View", in *Proc., OFC/NFOEC, Workshop on Energy Footprint of ICT*, San Diego, CA USA, Mar. 2009, pp. 1-3.

Nieminen, J., et al., "Energy-Adaptive Scheduling and Queue Management in Wireless LAN Mesh Networks", *Wireless Internet Conference (WICON)*, pp. 1-9, Singapore, Mar. 2010.

Skubic, Bjorn, et al., "Evaluation of ONU Power Saving Modes for Gigabit-Capable Passive Optical Networks", *IEEE Networks*, vol. 25, No. 2, pp. 20-24, Mar-Apr. 2011.

Tucker, Rodney, et al., "Evolution of WDB Optical IP Networks: A Cost and Energy Perspective", *IEEE/OSA Journal of Lightwave Technology*, vol. 27, No. 3, pp. 243-252, Feb. 2009.

Wong, S., et al., "Demonstration of Energy Conserving TDM-PON with Sleep Mode ONU using fast Clock Recovery Circuit", in *Proc., OFC/NFOEC*, pp. 1-3, San Diego, CA, US, Mar. 2010.

Zhang, Yi, et al., "Energy Efficiency in Telecom Optical Networks", *IEEE Communications Surveys & Tutorials*, vol. 12, No. 4, pp. 441-458, *Fourth Quarter* 2010.

International Search Report and Written Opinion, Application No. PCT/US2012/044733, dated Nov. 7, 2012, 12 pages.

"GPON Power Conservation", May 15, 2009, pp. 1-46, *Series G, Supplement 45, ITU-T Standard International Telecommunication Union*.

\* cited by examiner

ENERGY EFFICIENCY AND COST EFFICIENT PROTECTION IN PASSIVE OPTICAL NETWORKS

FIELD OF THE INVENTION

The embodiments of the invention relate to a system for improving energy and cost efficiency in a passive optical network. Specifically, the embodiments of the invention relate to a system and method for using alternate routing through an aggregate optical network unit to cost effectively improve protection and improve energy efficiency.

BACKGROUND

Passive optical networks (PONs) have the ability to provide high levels of bandwidth while only requiring low energy consumption. This makes PONs useful in providing broadband access. In addition, PONs provide large, huge capacity, small attenuation, low operational expenditures, and longevity. PONs consume less energy and are more efficient than competing technologies such as other types of optical and wireless systems.

PONs are more energy efficient per bit than hybrid fiber-copper based access technologies, e.g., fiber-to-the-node (FTTN), and wireless access solutions, e.g., WiMAX. PONs are also more energy efficient than fiber-to-the-home (FTTH) network technologies such as point-to-point and active optical access networks. These qualities make PON deployments attractive especially to address concerns about the greenhouse impact of the Internet.

Figure 1:
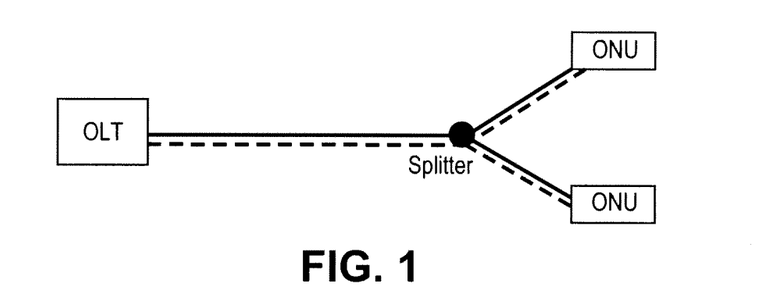
FIG. 1 is a diagram of a tree-based passive optical network.

FIG. 1 is a diagram of a conventional tree-based PON. Typically, PONs have a physical tree topology with the optical line terminal (OLT) located at the root and the subscribers connected to the leaf nodes of the tree at a distance of up to 20 km. The PON connects the OLT to multiple optical network units (ONUs), also known as optical network terminals (ONTs) or customer premises equipment. The ONUs are connected to the OLT through a 1:N optical splitter/combiner. To protect the communication between the OLT and the ONU, a second protection fiber (shown as dashed lines) duplicates the connections and links of the PON significantly increasing the cost. This protection fiber is used when the primary fiber fails.

In the point-to-multipoint downstream direction (i.e., OLT to ONU), the OLT is able to broadcast data to all ONUs simultaneously due to the directional property of the optical splitter/combiner. In the upstream direction, however, ONUs cannot communicate directly with one another. Instead, each ONU is able to send data only to the OLT in a multipoint-to-point manner. To allow all ONUs to share the optical line between the OLT and the ONUs, a multiple access protocol is utilized, such as time division multiple access (TDMA) is utilized.

In both Institute of Electrical and Electronics Engineers (IEEE) Ethernet PON (EPON) and International Telecommunication Union Standardization Sector (ITU-T) Gigabit PON (GPON), a polling mechanism is proposed to facilitate bandwidth allocation. More specifically, each ONU reports its required bandwidth (i.e., queue occupancy) to the OLT and the OLT informs the ONUs about their assigned upstream transmission windows in the downstream frame. EPON introduces report and gate messages in both the upstream and downstream directions to report and specify the ONU upstream transmission grants, respectively. In GPON, each upstream and downstream frame contains a dynamic bandwidth report (DBRu) and a physical control block (PCBd), respectively. DBRu is used for reporting the required bandwidth by an ONU. PCBd includes a bandwidth map (BW-map) field to specify the ONU upstream transmission grants.

SUMMARY

The embodiments of the invention include a method for improving efficiency in a passive optical network (PON) implemented by an optical network unit (ONU) connected to an optical line terminal (OLT) over an optical line. The ONU is connected with an aggregating ONU (AG-ONU) in the PON through an alternate connection separate from the PON. The ONU improves cost and energy efficiency of the PON by entering a sleep mode that disables communication with the OLT to reduce energy consumption when the ONU is idle. The ONU restarts communication with the OLT upon receipt of data traffic by performing the method comprising a set of steps. The steps include checking whether the received data traffic has a high priority and low bandwidth requirement, checking whether the alternate connection can service the received data traffic having the high priority and low bandwidth requirement, processing the received data traffic having the high priority and low data bandwidth requirement that can be serviced by the alternate connection by transmitting the received data traffic to the AG-ONU over the alternate connection to be forwarded to the OLT over the PON, processing the received data traffic having a low priority or high data bandwidth requirement by transmitting a report control packet to the OLT via the alternate connection with the AG-ONU, switching the ONU to an active mode from the sleep mode to receive a grant from the OLT over the optical line, and transmitting the received data traffic to the OLT over the optical line based on the grant.

The embodiments of the invention include a method for improving efficiency in a passive optical network (PON) implemented by a optical line terminal (OLT) connected to an optical network unit (ONU) over an optical line. The ONU is connected with an aggregating ONU (AG-ONU) in the PON through an alternate connection separate from the PON. The ONU improves cost and energy efficiency by entering a sleep mode that disables communication with the OLT to reduce energy consumption when the ONU is idle. The OLT restarts communication with the ONU upon receipt of data traffic for the ONU by performing the method comprising a set of steps. The steps include checking whether the received data traffic has a high priority and low bandwidth requirement, checking whether the alternate connection can service the received data traffic for the ONU having the high priority and low bandwidth requirement, processing the received data traffic for the ONU having the high priority and low data bandwidth requirement that can be serviced by the alternate connection by transmitting the received data traffic to the AG-ONU over the PON to be forwarded to the ONU over the alternate connection, processing the received data traffic having a low priority or high data bandwidth requirement by transmitting a control packet to the AG-ONU via the PON to be forwarded by the AG-ONU to the ONU over the alternate connection, detecting that the ONU has switched to an active mode from the sleep mode to receive the received data traffic from the OLT over the optical line, and transmitting the received data traffic to the ONU over the optical line.

The embodiments of the invention include a network element implementing an optical network unit (ONU) that is configured to improve efficiency in a passive optical network (PON). The ONU is connected to an optical line terminal (OLT) over an optical line. The ONU is connected with an aggregating ONU (AG-ONU) in the PON through an alternate connection separate from the PON. The ONU improves cost and energy efficiency for the PON by entering a sleep mode that disables communication with the OLT over the optical line to reduce energy consumption when the ONU is idle. The ONU restarts communication with the OLT over the optical line upon receipt of data traffic. The ONU comprises an ingress module, egress module, alternate connection module and network processor. The ingress module is coupled to the optical line. The ingress module is configured to receive data from the OLT over the optical line. The egress module is coupled to the optical line. The egress module is configured to transmit data to the OLT over the optical line. The alternate connection module is configured to communicate with the AG-ONU. The network processor is communicatively coupled to the ingress module, the egress module and the alternate connection module. The network processor is configured to execute a quality of service module. The AG-ONU monitor module. A traffic forwarding module and a power management module. The quality of service module is configured to check whether received data traffic has a high priority and low bandwidth requirement. The AG-ONU monitor module is configured to check whether the alternate connection can service the received data traffic for the received data traffic having the high priority and low bandwidth requirement. The traffic forwarding module is configured to process the received data traffic having the high priority and low data bandwidth requirement that can be serviced by the alternate connection by transmitting the received data traffic to the AG-ONU over the alternate connection to be forwarded to the OLT over the PON. The traffic forwarding module is configured to process the received data traffic having a low priority or high data bandwidth requirement by transmitting a report control packet to the OLT via the alternate connection with the AG-ONU and by transmitting the data traffic to the OLT over the optical line based on a grant. The power management module is configured to switch the ONU to an active mode from the sleep mode to receive the grant from the OLT over the optical line and to transmit the received data traffic.

The embodiments of the invention include a network element implementing an optical line terminal (OLT) that is configured to improve efficiency in a passive optical network (PON). The OLT is connected to an optical network unit (ONU) over an optical line. The ONU is connected with an aggregating ONU (AG-ONU) in the PON through an alternate connection separate from the PON. The ONU improves cost and energy efficiency for the PON by entering a sleep mode that disables communication with the OLT to reduce energy consumption when the ONU is idle. The OLT restarts communication with the ONU over the optical line upon receipt of data traffic for the ONU. The OLT comprises an ingress module, egress module and a network processor. The ingress module is coupled to the optical line. The ingress module is configured to receive data from the ONU over the optical line. The egress module is coupled to the optical line. The egress module is configured to transmit data to the ONU over the optical line. The network processor is communicatively coupled to the ingress module and the egress module. The network processor is configured to execute a quality of service module, an AG-ONU monitor module, a traffic forwarding module and an ONU management module. The quality of service module is configured to check whether the received data traffic for the ONU has a high priority and low bandwidth requirement. The AG-ONU monitor module is configured to check whether the alternate connection can service the received data traffic for the ONU having the high priority and low bandwidth requirement. The traffic forward-ing module is configured to process the received data traffic having the high priority and low data bandwidth requirement that can be serviced by the alternate connection by transmitting the received data traffic for the ONU to the AG-ONU over the PON to be forwarded to the ONU over the alternate connection. The traffic forwarding module is configured to process the received data traffic having a low priority or high data bandwidth requirement by transmitting a control packet to the AG-ONU via the PON to be forwarded by the AG-ONU to the ONU over the alternate connection and transmitting the data traffic for the ONU to the ONU over the optical line based on a grant. The ONU management module is configured to receive a message from the ONU that the ONU has switched to an active mode from the sleep mode to receive the received data traffic from the OLT over the optical line.

It is an object of the invention to provide a system and method for using alternate routing through an aggregate optical network unit to cost effectively improve protection and improve energy efficiency in a PON. The advantages of the embodiments of the invention include a system and process by which an aggregation ONU (AG-ONU) is provided that can reach other ONUs through an alternate communication medium when the ONU has powered down equipment for the communication over an optical line to the OLT or the optical line is unavailable. The ONUs can then power down their PON related architecture when idle and can re-establish the connection with the OLT in a timely manner through the AG-ONU, which is always on. Additional advantages include that the alternate connection through the AG-ONU allows a more cost efficient protection scheme where the connection between the AG-ONU is duplicated.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 2-4 and 7. However, it should be understood that the operations of the flow diagrams in FIGS. 4 and 5 can be performed by embodiments of the invention other than those discussed with reference to FIGS. 2-4 and 7, and the embodiments discussed with reference to FIGS. 2-4 and 7 can perform operations different than those discussed with reference to the flow diagrams of FIGS. 4 and 5.

The techniques shown in the figures can be implemented using code and data stored and executed on one or more electronic devices (e.g., an end station, a network element, or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

The embodiments of the present invention provide a method and system for avoiding the disadvantages of the prior art. The disadvantages of the prior art include that current techniques for conserving energy by placing all or part of an optical network unit (ONU) into a sleep mode or similar mode result in increased delays and sometimes packet losses due to the time required for the process of re-activating the ONU. Also, protection techniques utilize full duplication of lines to each ONU, which also significantly increases the cost of deploying a PON.

Energy Efficiency Techniques.

The XG-PON standard and similar standards introduces low-power operation modes: (i) shedding, (ii) sleeping (also known as cyclic sleeping), and (iii) dozing. In ONU power shedding mode, non-essential functions are powered off or reduced. While the transmitter and receiver modules of ONU are powered off in the sleeping mode, the doze mode turns off the transmitter part for substantial periods of time only. The sleeping mode is further subdivided into fast sleep and deep sleep. In the fast sleep mode, the power save state sojourn consists of a sequence of sleep cycles, each composed of a sleep period and an active period. In the deep sleep mode, the transmitter and receiver remain off for the entire duration of the power save state sojourn. The cyclic sleep can provide a greater power saving, however, it results in reducing the quality of service (QoS) performance for longer sleep intervals. The power consumption of the PON can be decreased without incurring any significant QoS penalties by deploying the doze mode. Another power-saving technique is adapting the PON line rate with the traffic load.

In these systems, there is an attempt to put low-load nodes into a sleep mode, however, the mechanism of how these nodes should be powered on in a specific instance to avoid QoS performance decreases is missing. Different types of traffic have various delay and bandwidth requirements to support QoS for end-users. For instance, the IEEE 803.3az energy efficient Ethernet (EEE) standard introduces an overhead for waking up and sleeping the Ethernet link, where the low-power idle mode is defined when there is no packet to transmit. In EEE, packet coalescing, which assembles multiple packets before sending them, can improve the channel and energy efficiency by reducing the number of wake and sleep time intervals.

However, the coalescing also increases delay and even causes packet loss in downstream buffers. The embodiments of the invention provide a method and system for improving QoS, while obtaining improved energy conservation in comparison to these methods.

Protection Techniques.

Network protection is an important issue for networking and is a network design scheme to avoid service outage for a PON's end-users. Several different PON network protection schemes have been specified including: (i) a feeder fiber protection, which protects the feeder fiber (deployed between OLT and splitter) using a spare fiber. In this scheme the spare fiber is attached to the feeder fiber via an optical switch; (ii) a feeder fiber & OLT protection which, additionally, provides protection for the OLT using an extra OLT; (iii) a full duplication, which further protects all ONUs and their distribution fibers with duplicate distribution fibers; (iv) independent duplication of feeder and branch fibers, which protects feeder and distribution fibers independently and provides OLT and ONU fault recovery. The feeder fiber & OLT protection as well as full duplication techniques are discussed in ITU-T G.983.5 for the delivery of highly reliable services. These full duplication and independent protection techniques provide a higher level of survivability, while they are costly, especially in terms of cabling (i.e., trenching, ducting, and optical fiber) for distribution fibers and deploying extra ONUs. A more cost effect scheme is provided by the embodiments of the invention.

The embodiments of the invention overcome these disadvantages of the prior art. The embodiments of the invention provide a system and process by which an aggregation ONU (AG-ONU) is provided that can reach other ONUs through an alternate communication medium when the ONU has powered down equipment for the communication over an optical line to the OLT or the optical line is unavailable. The ONUs can then power down their PON related architecture when idle and can re-establish the connection with the OLT in a timely manner through the AG-ONU, which is always on. Similarly, the alternate connection through the AG-ONU allows a more cost efficient protection scheme where only the connection between the AG-ONU and OLT is duplicated, thereby avoiding the cost of duplicating lines between each ONU and the OLT.

Figure 2:
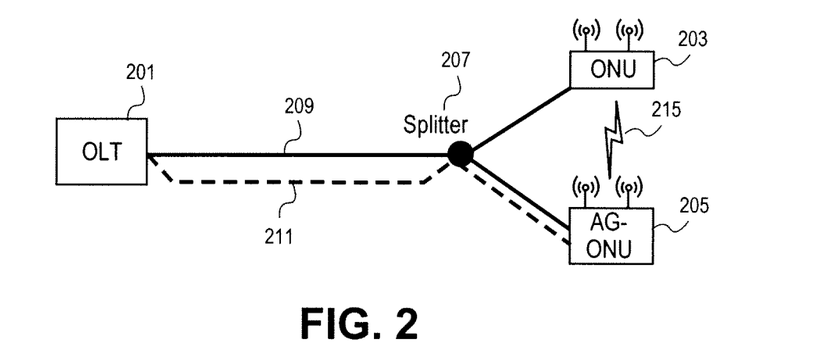
FIG. 2 is a diagram of one embodiment of a power aware and optically protected passive optical network.

FIG. 2 is a diagram of one embodiment of a power aware and optically protected passive optical network. In this architecture, the ONUs are augmented with wired or wireless communication equipment (referred to herein as 'alternate connection equipment' or an 'alternate connection') in addition to the optical communication equipment. In this architecture, any of the above-mentioned power saving techniques can be deployed (e.g., a 'dozed mode'). For waking up the ONU to receive downstream data and for requesting bandwidth from an OLT for the purpose of transmitting upstream data, the embodiments of the invention include an always-activated ONU, referred to herein as an aggregation-ONU (AG-ONU). The OLT and ONUs send their control packets (e.g., report and gate messages using EPON or DBRu and PCBd using GPON) to the AG-ONU and use the alternate connection in place of the optical line between them.

In one example embodiment, a wireless mesh network connects a set of ONUs with an AG-ONU, which provides multi-hop communications to forward traffic en route to and from one ONU by means of intermediate ONUs in the set of ONUs. A 'set,' as used herein, refers to any positive whole number of items including one item. It is not required that all ONUs are located in the range of the AG-ONU or are in direct communication with the AG-ONU. An ONU can communicate with an AG-ONU through other intermediate ONUs, which transfer the incoming/outgoing packets to the AG-ONU.

The passive optical network (PON) can include any number of OLTs 201, ONUs 203, optical lines 209, splitters 207, protection lines 211 and AG-ONUs 205. For sake of clarity, the example of a basic configuration with one of each component has been illustrated. One skilled in the art would understand that the principles and features of the invention as described herein are also applicable to larger and more complicated PONs.

The OLT 201 can be any networking device capable of transmitting data over an optical line 209 to a set of ONUs 203,205. The OLT 201 can connect the PON with other networks including wide area networks such as the Internet. Connections to other nodes in such networks can be optical connections or other types of wired or wireless connections. The OLT 201 manages communication over the optical line 209 amongst the set of ONUs 203,205. The OLT 201 also participates in the protection scheme and energy saving scheme of the PON. The protection scheme is implemented as a duplicate optical line between the OLT 201 and the AG-ONU 205. If the primary optical line 209 fails, then the OLT 201 can switch to the secondary optical line 211 and the AG-ONU can forward traffic for other ONUs 203 over an alternate connection 215.

The optical lines 209, 211 are typically single fibers connected to the OLT 201. These fibers can be split by a splitter 207 or any number of splitters in a tree like topology, such that a fiber reaches each ONU 203, 205. The fiber can be split as many as 64 or more times to reach as many ONUs. A splitter 207 can divide out any number of fibers from the optical line and can be used in any number or combination with other splitters along the length of the optical lines 209, 211 to divide and subdivide the fiber of the optical lines 209, 211.

The ONUs 203 can be networking elements capable of communicating over an optical line and an alternate connection 215. The ONUs can communicate over any number of connections including the optical line 209 and alternate connection 215. The ONUs 203 can implement any type or combination of sleep modes to reduce power consumption, while maintaining QoS through the use of the alternate connection 215 to reestablish communication over the optical line with the OLT 201. The alternate connection 215 can be always on, but requires less power than the optical line hardware or can be activated from a sleep state and reestablish a connection with the AG-ONU 205 while maintaining QoS. The ONUs 203 can be connected to additional devices downstream such as user devices or premises equipment from which it receives upstream data and to which it provides downstream data.

The AG-ONU 205 provides the functionality of a standard ONU and in addition remains always on to assist other ONUs 203 to re-establish communication between the OLT 201 and ONU 203 while maintaining QoS for the data. The AG-ONU 205 can include a set of alternate connection equipment to support any number of alternate connections with ONUs 203. The AG-ONU 205 also works in conjunction with the OLT 201 to implement the protection scheme using the secondary optical line 211. The AG-ONU 205 can act as an intermediate node to re-establish communications between the OLT 201 and ONU 203 in the event of a failure on the primary optical line 209. In one embodiment, the AG-ONU 205 contains a MAC enhanced legacy ONU, which performs aggregation operations for upstream traffic based on their traffic types (i.e., QoS requirements). The function of the AG-ONU 205, ONU 203 and OLT 201 to manage power and protection schemes is discussed in further detail herein below in regard to FIGS. 5-7.

Figure 3:
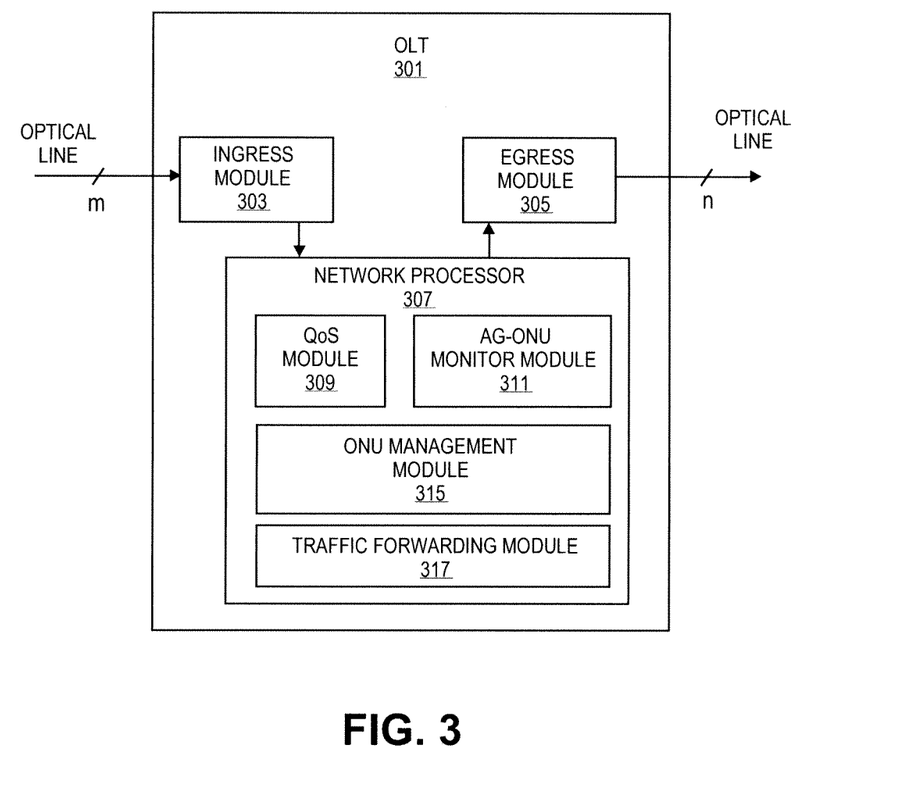
FIG. 3 is a diagram of one embodiment of a network element implementing an optical line terminal.

FIG. 3 is a diagram of one embodiment of a network element implementing an optical line terminal (OLT). The OLT 301 can include an ingress module 303 and egress module 305 or a set of such modules. The ingress module 303 receives incoming data over a set of optical lines or fibers, this can be upstream and/or downstream data traffic. The egress module 305 transmits data over a set of optical lines or fibers, this can be upstream and/or downstream data traffic. Received data traffic is passed by the ingress module 303 to a network processor 307 for further processing. Outbound data traffic to be transmitted is passed by the network processor 307 to the egress module 305 to transmit the data over the set of optical lines toward a set of destination nodes.

The network processor 307 can execute any number of software modules or can have hardware components to process all inbound and outbound data according to any set of protocols. These software modules and hardware components can include a quality of service module 309, an AG-ONU monitor module 311, an ONU management module 315 and a traffic forwarding module 317 amongst other modules and components.

The quality of service module 309 can examine data to determine a level of quality of service (QoS) that is required. The QoS module 309 can examine packet headers, packet type, packet source or destination and similar characteristics to determine the required QoS for the data. The QoS level for data can be provided to other modules such as the traffic forwarding module 317 to determine the manner in which the data is to be forwarded given the state of the ONU it is to be sent to and the QoS level required for the data. The process is described in greater detail in regard to FIG. 6.

The AG-ONU monitor module 311 can communicate with an AG-ONU or set of AG-ONUs to monitor the status of their alternate connections and to track the ONUs that are reachable through these alternate connections. This information can be provided to the traffic forwarding module 317 and ONU management module 315 to be used to manage communications regarding the power state of the ONUs and forwarding traffic to the ONUs.

The ONU management module 315 tracks the state of all ONUs in communication with the OLT over an optical line. The ONU management module 315 can track the power management status (e.g., sleep mode, dozing mode or active mode) of each ONU and can assign grants, transmission windows or similarly manage optical line usage for all of the connected ONUs. The ONU management module can generate reports or messages to be sent to the ONUs or the AG-ONUs to activate the ONUs from a powered down state when data is received that is to be transmitted to the ONU prior to any scheduled active period for the ONU.

The traffic forwarding module 317 processes upstream and downstream traffic to determine where and how it should be forwarded. The data destined for an ONU is processed according to the QoS level required for the data, the availability of the optical line to a destination and the state of any AG-ONU or ONU that is intermediate or a destination of the data traffic. The traffic forwarding module 317 can process and forward downstream data traffic as described in FIG. 6. The traffic forwarding module 317 can also implement the protection scheme for the downstream traffic when failure is detected along the primary optical line by determining a route to the destination ONU through the AG-ONU. The forwarding module 317 works in conjunction with the ONU and AG-ONU to also process upstream traffic and to manage the timing of data transmission and the power status of the ONUs.

Figure 4:
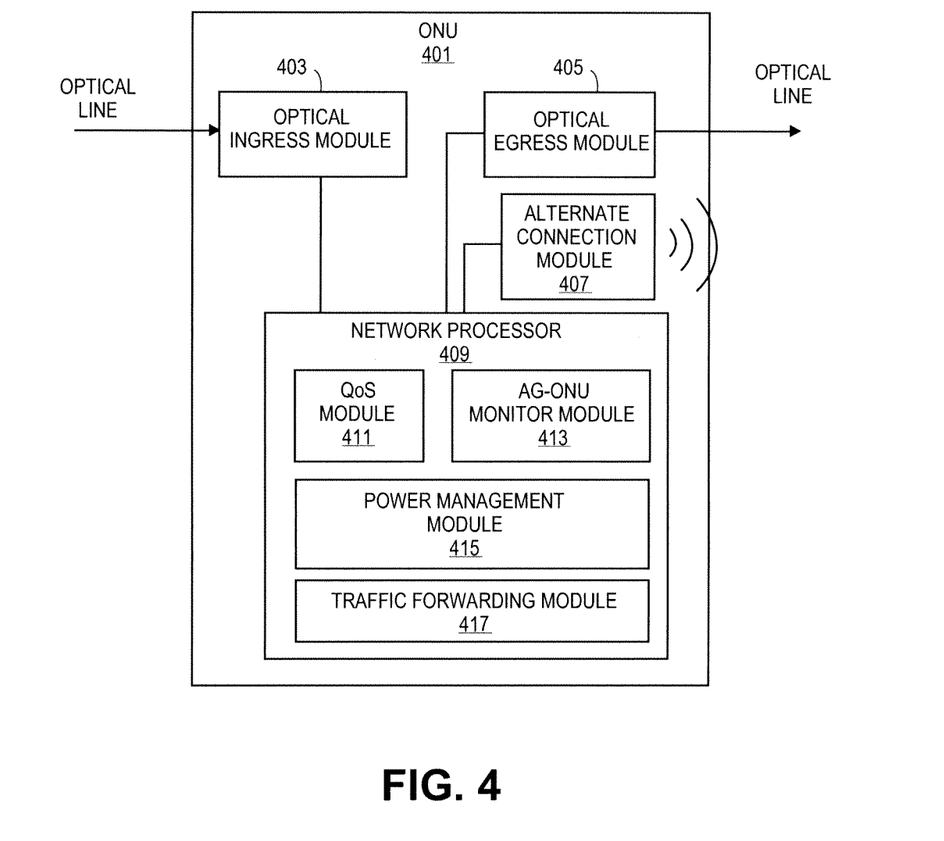
FIG. 4 is a diagram of one embodiment of a network element implementing an optical network unit.

FIG. 4 is a diagram of one embodiment of a network element implementing an optical network unit. The ONU 401 can include an optical ingress module 403 and optical egress module 405 or a set of such modules. The optical ingress module 403 receives incoming data over a set of optical lines or fibers, this can be upstream and/or downstream data traffic. The optical egress module 405 transmits data over a set of optical lines or fibers, this can be upstream and/or downstream data traffic. Received data traffic is passed by the optical ingress module 403 to a network processor 409 for further processing. Data traffic to be transmitted is passed by the network processor 409 to the optical egress module 405 to transmit the data over the set of optical lines toward a set of destination nodes. In an embodiment where the ONU 401 is an AG-ONU a second set of optical ingress and egress modules can be utilized to communicate over a secondary optical line to implement a protection scheme for the PON. A protection switch module can also be provided to detect failures and switch communication over to the secondary optical line.

The ONU 401 can also include alternate connection equipment or module 407, such as a wired or wireless module. The alternate connection module 407 enables the ONU to communicate with an AG-ONU either directly or through another ONU. The ONU 401 can include any number of alternate connection modules 407 to enable communication with any number of other ONUs, AG-ONUs or similar devices. In an embodiment, where the ONU 401 is an AG-ONU the alternate connection module 407 enables communication with a set of ONUs in the PON.

The network processor 409 can execute any number of software modules or can have hardware components to process all inbound and outbound data according to any set of protocols. These software modules and hardware components can include a quality of service module 411, an AG-ONU monitor module 413, a power management module 415 and a traffic forwarding module 419 amongst other modules and components.

The quality of service module 411 can examine data to determine a level of quality of service (QoS) that is required. The QoS module can examine packet headers, packet type, packet source or destination and similar characteristics to determine the required QoS for the data. The QoS level for data can be provided to other modules such as the traffic forwarding module 417 to determine the manner in which the data is to be forwarded given the state of the ONU and the QoS level required for the data. The process is described in greater detail in regard to FIG. 5.

The AG-ONU monitor module 413 can communicate with an AG-ONU or set of intermediate ONUs to monitor the status of the alternate connection and determine the reachability of the AG-ONU. This information can be provided to the traffic forwarding module 417 to be used to manage communications regarding the power state of the ONU and forwarding traffic to the OLT.

The power management module 415 tracks the power state of the ONU 401 and the state of communication with the OLT over an optical line. The power management module 415 can track the power management status (e.g., sleep mode, dozing mode or active mode) of the ONU 401 and can track assigned grants, transmission windows or similarly track optical line usage for the ONU 401. The power management module can generate reports or messages to be sent to the OLT or the AG-ONU and can activate the ONU from a powered down state when data is received that is to be transmitted to the OLT and when a request to change state is received from the AG-ONU prior to any scheduled active period for the ONU.

The traffic forwarding module 417 processes upstream and downstream traffic to determine where and how it should be forwarded. The data destined for an OLT is processed according to the QoS level required for the data, the availability of the optical line to a destination and the state of the ONU. The traffic forwarding module 417 can process and forward upstream data traffic as described in FIG. 5. The traffic forwarding module 417 can also implement the protection scheme for the upstream traffic when failure is detected along the primary optical line by determining a route to the destination OLT through the AG-ONU. The traffic forwarding module 417 works in conjunction with the OLT and AG-ONU to also process downstream traffic and to manage the timing of data transmission and the power status of the ONU.

Figure 5:
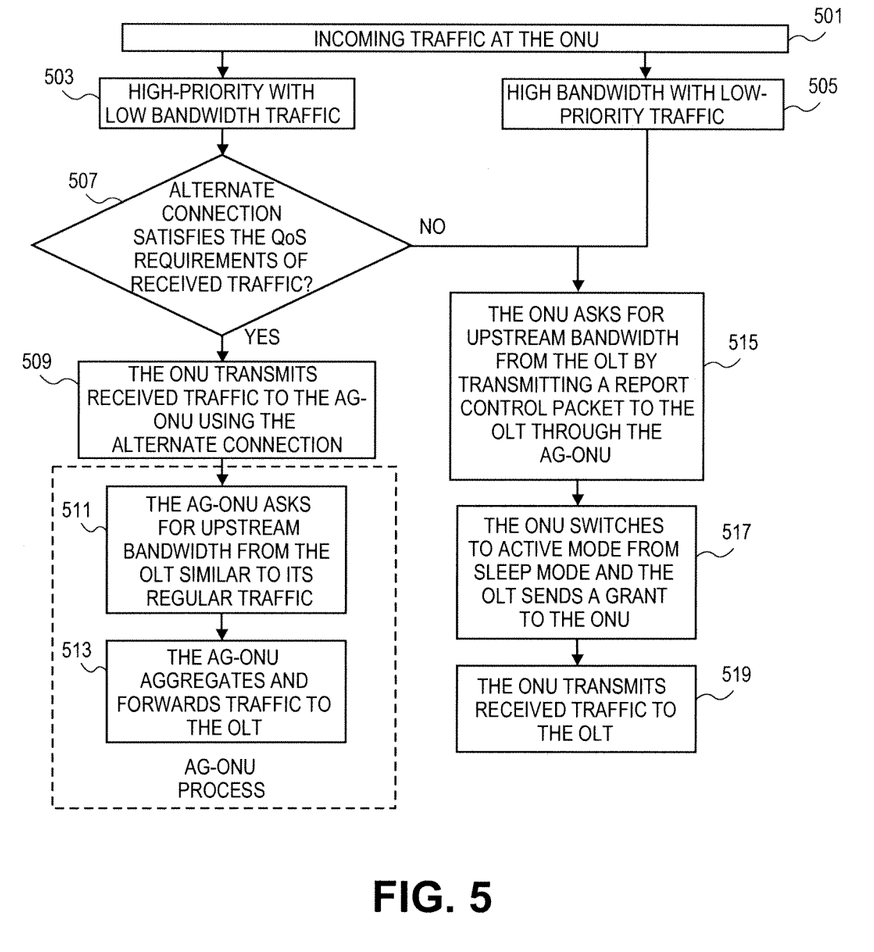
FIG. 5 is a flowchart of one embodiment of the process executed by the optical network unit.

FIG. 5 is a flowchart of one embodiment of the process executed by the optical network unit. The process of transmitting upstream data traffic is initiated in response to receiving data traffic at the ONU (Block 501). This process is utilized when the ONU is in a sleep state or similar state where the upstream communication with the OLT is not active and the ONU does not have an assigned grant or transmission window through which to transmit the received data. The ONU examines the received data to determine whether it is high priority QoS data and whether it has low bandwidth requirements (Block 503) or whether it has high bandwidth requirements or a low priority QoS level (Block 505). High bandwidth requirements will require the use of the optical line and low priority data can wait for the optical line to be available again, this categorization limits the amount of bandwidth required of the alternate connection and the AG-ONU, which must service other ONUs.

If the received data is high priority and low bandwidth data, then a check is made to determine whether the alternate connection (e.g., a wireless connection) for the ONU is capable of handling this data by satisfying the QoS and bandwidth requirements (Block 507). If the alternate connection is not capable of servicing the data, then the data is handled in the same manner as other types of data (Block 505). If the alternate connection can handle the received data, then the ONU transmits the received data to the AG-ONU over the alternate connection (Block 509).

The AG-ONU receives this data traffic and requests bandwidth from the OLT to transmit the data in a manner similar to requesting bandwidth for transmitting its own data to the OLT (Block 511). The AG-ONU can use any multiple access protocol or similar protocol for obtaining the bandwidth for the received data. The AG-ONU can then transmit this data to the OLT. In some embodiments, the AG-ONU will aggregate or attempt to aggregate the data received from other ONUs (Block 513). The AG-ONU can aggregate data from multiple ONUs to be transmitted to the OLT.

When the data is not transmitted to the AG-ONU, the ONU sends a report control packet or similar request message to the OLT through the AG-ONU to obtain a grant or transmission window and requisite bandwidth to transmit the received data over the optical line (Block 515). This report control packet is transmitted to the AG-ONU over the alternate connection. The ONU then switches to an active mode from its sleep mode or similar mode (Block 517). The ONU can then receive the grant or transmission window assignment over the optical line from the OLT. The ONU then transmits the received data to the OLT on the optical line according to the grant or transmission window.

Figure 6:
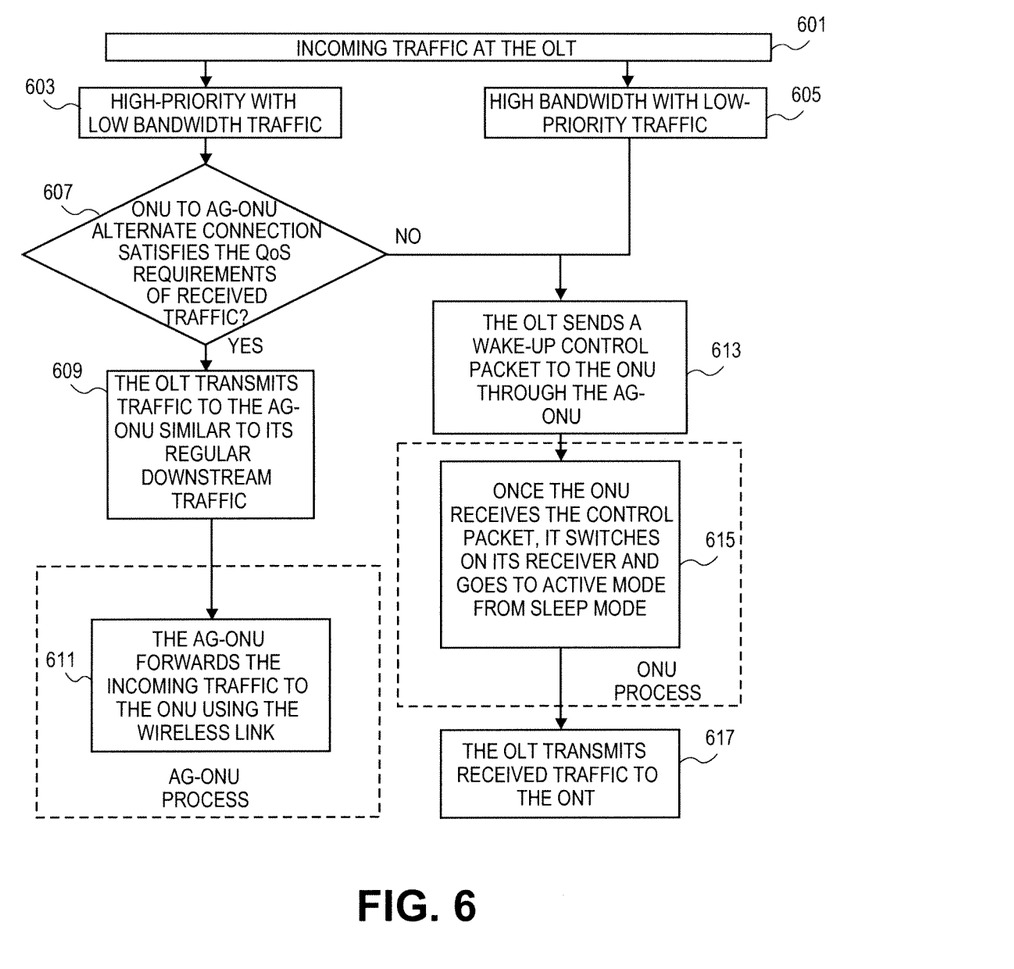
FIG. 6 is a flowchart of one embodiment of the process executed by the optical line terminal.

FIG. 6 is a flowchart of one embodiment of the process executed by the optical line terminal. The process of transmitting downstream data traffic is initiated in response to receiving data traffic at the OLT for an ONU (Block 601). This process is utilized when the destination ONU is in a sleep state or similar state where the downstream communication with the ONU is not active and the ONU is not able to receive data over the optical network. The OLT examines the received data to determine whether it is high priority QoS data and whether it has low bandwidth requirements (Block 603) or whether it has high bandwidth requirements or low priority QoS level (Block 605). High bandwidth requirements will require the use of the optical line and low priority data can wait for the optical line to be available again, this categorization limits the amount of bandwidth required of the alternate connection between the ONU and the AG-ONU, which must also service other ONUs.

If the received data is high priority and low bandwidth data, then a check is made to determine whether the alternate connection (e.g., a wireless connection) between the destination ONU and the associated AG-ONU is capable of handling this data by satisfying the QoS and bandwidth requirements (Block 607). If the alternate connection is not capable of servicing the data, then the data is handled in the same manner as other types of data (Block 605). If the alternate connection can handle the received data, then the OLT transmits the received data to the AG-ONU over its optical line with the AG-ONU in a manner similar to transmitting data traffic with the AG-ONU as the destination (Block 609). The AG-ONU receives this data traffic and can then transmit this data to the ONU using the alternate connection.

When the data is not transmitted to the AG-ONU, the OLT sends a wake-up control packet or similar message to the ONU through the AG-ONU to reactivate the ONU so that the data can be transmitted directly to the ONU over the optical line (Block 613). This wake-up control packet is transmitted by the AG-ONU over the alternate connection to the ONU. The ONU then switches to an active mode from its sleep mode or similar mode (Block 615). The ONU can automatically detect when the ONU has transitioned over to active mode. The OLT then transmits the received data to the ONU on the optical line according to the grant or transmission window (Block 617).

Figure 7:
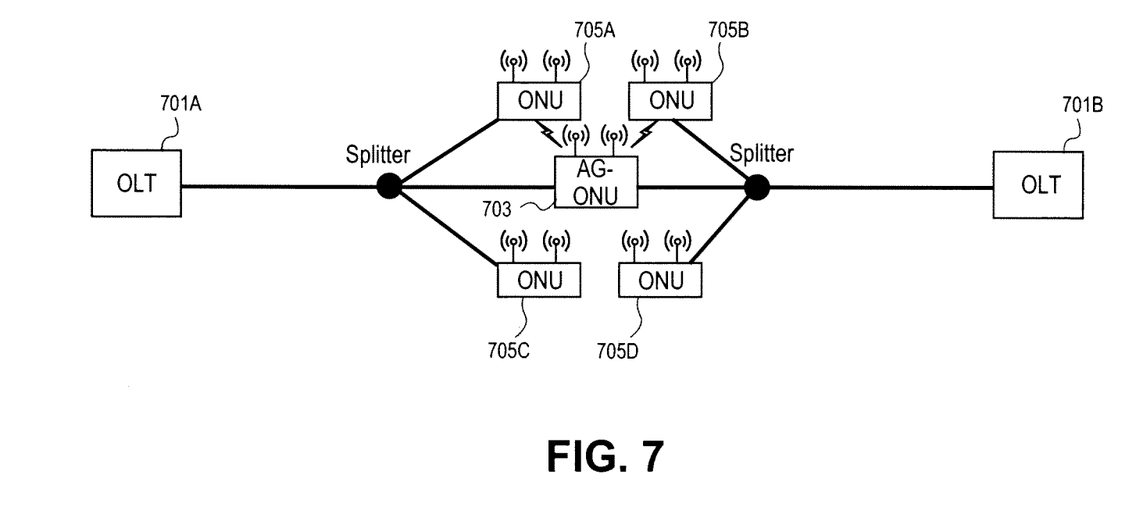
FIG. 7 is a diagram of one embodiment of a power aware and wirelessly protected passive optical network.

FIG. 7 is a diagram of one embodiment of a power aware and wirelessly protected passive optical network. In this example embodiment, an alternate protection scheme is presented that avoids the need to install a dedicated secondary optical line between the OLT 701A, B and the AG-ONU 705. In this embodiment, the AG-ONU 703 and the ONUs 705A-D are connected to two PONs including two OLTs 701A,B. The AG-ONU 703 and ONUs 705A-D are connected through a set of alternate connections, such as a wireless network mesh or similar network configuration. If the optical lines to either OLT are disabled, then the other OLT can provide an alternate connection until the optical line to the other OLT is restored.

The embodiments provide benefits in ease of network configuration and cost-efficiency. In addition to the above-mentioned layer-2 techniques, the embodiments provide benefits from in terms of cost-efficiency and flexibility of the equipment utilized to set up these PONs. While PON brings fiber as close as possible to an end-user, in an alternative embodiment, unlicensed frequency band Wi-Fi, which deploys a cost-efficient WLAN and provides mobility and flexibility for end-users could be used in place of a PON and similar types of networks can also benefit from the structures and features of the invention described herein.

Another important benefit of the embodiments of the invention is providing mobile backhaul support for mobile end-users. Using the embodiments of the invention, it is possible to provide and protect QoS-enabled wireless services for mobile end-users.

Thus, a method, system and apparatus for an energy and cost-efficient PON and similar networks have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for improving efficiency in a passive optical network (PON) implemented by a optical network unit (ONU) connected to an optical line terminal (OLT) over an optical line, the ONU connected with an aggregating ONU (AG-ONU) in the PON through an alternate connection separate from the PON, the ONU improving cost and energy efficiency of the PON by entering a sleep mode that disables communication with the OLT to reduce energy consumption when the ONU is idle, the ONU to restart communication with the OLT upon receipt of data traffic by performing the method comprising the steps of:
   checking whether the received data traffic has a high priority and low bandwidth requirement (503);
   checking whether the alternate connection can service the received data traffic having the high priority and low bandwidth requirement (507);
   processing the received data traffic having the high priority and low data bandwidth requirement that can be serviced by the alternate connection by transmitting the received data traffic to the AG-ONU over the alternate connection to be forwarded to the OLT over the PON (509); and
   processing the received data traffic having a low priority or high data bandwidth requirement by (505),
      transmitting a report control packet to the OLT via the alternate connection with the AG-ONU (515),
      switching the ONU to an active mode from the sleep mode to receive a grant from the OLT over the optical line (517), and
      transmitting the received data traffic to the OLT over the optical line based on the grant (519).

2. The method of claim 1, wherein checking whether the alternate connection can service the received data traffic further comprises:
  transmitting hello packets periodically to the AG-ONU; and
  receiving acknowledgement packets from the AG-ONU.

3. The method of claim 1, wherein the grant specifies a transmission window on the optical line during which only the ONU can transmit data to the OLT.

4. The method of claim 1, wherein the alternate connection is a wireless connection.

5. A method for improving efficiency in a passive optical network (PON) implemented by a optical line terminal (OLT) connected to an optical network unit (ONU) over an optical line, the ONU connected with an aggregating ONU (AG-ONU) in the PON through an alternate connection separate from the PON, the ONU improving cost and energy efficiency by entering a sleep mode that disables communication with the OLT to reduce energy consumption when the ONU is idle, the OLT to restart communication with the ONU upon receipt of data traffic for the ONU by performing the method comprising the steps of:
  checking whether the received data traffic has a high priority and low bandwidth requirement (603);
  checking whether the alternate connection can service the received data traffic for the ONU having the high priority and low bandwidth requirement (607);
  processing the received data traffic for the ONU having the high priority and low data bandwidth requirement that can be serviced by the alternate connection by transmitting the received data traffic to the AG-ONU over the PON to be forwarded to the ONU over the alternate connection (609); and
  processing the received data traffic having a low priority or high data bandwidth requirement (605) by,
    transmitting a control packet to the AG-ONU via the PON to be forwarded by the AG-ONU to the ONU over the alternate connection (613),
    detecting that the ONU has switched to an active mode from the sleep mode, and
    transmitting the received data traffic to the ONU over the optical line (617).

6. The method of claim 5, wherein checking whether the alternate connection can service the received data traffic further comprises:
  receiving a status of the alternate connection periodically from the AG-ONU.

7. The method of claim 5, wherein the grant specifies a transmission window on the optical line during which only the ONU can transmit data to the OLT.

8. The method of claim 5, wherein the alternate connection is a wireless connection.

9. A network element implementing an optical network unit (ONU) that is configured to improve efficiency in a passive optical network (PON), the ONU connected to an optical line terminal (OLT) over an optical line, the ONU connected with an aggregating ONU (AG-ONU) in the PON through an alternate connection separate from the PON, the ONU improving cost and energy efficiency for the PON by entering a sleep mode that disables communication with the OLT over the optical line to reduce energy consumption when the ONU is idle, the ONU to restart communication with the OLT over the optical line upon receipt of data traffic, the ONU comprising:
  an ingress module (403) coupled to the optical line, the ingress module configured to receive data from the OLT over the optical line;
  an egress module (405) coupled to the optical line, the egress module configured to transmit data to the OLT over the optical line;
  an alternate connection module (407) configured to communicate with the AG-ONU; and
  a network processor (409) communicatively coupled to the ingress module, the egress module and the alternate connection module, the network processor configured to execute a quality of service module, an AG-ONU monitor module, a traffic forwarding module and a power management module,
    the quality of service module (411) configured to check whether received data traffic has a high priority and low bandwidth requirement,
    the AG-ONU monitor module (413) configured to check whether the alternate connection can service the received data traffic for the received data traffic having the high priority and low bandwidth requirement,
    the traffic forwarding module (417) configured to process the received data traffic having the high priority and low data bandwidth requirement that can be serviced by the alternate connection by transmitting the received data traffic to the AG-ONU over the alternate connection to be forwarded to the OLT over the PON, the traffic forwarding module configured to process the received data traffic having a low priority or high data bandwidth requirement by transmitting a report control packet to the OLT via the alternate connection with the AG-ONU and by transmitting the data traffic to the OLT over the optical line based on a grant,
    the power management module (415) configured to switch the ONU to an active mode from the sleep mode to receive the grant from the OLT over the optical line and to transmit the received data traffic.

10. The network element of claim 9, wherein the AG-ONU monitor module is configured to check whether the alternate connection can service the received data traffic by transmitting hello packets periodically to the AG-ONU and receiving acknowledgement packets from the AG-ONU.

11. The network element of claim 9, wherein the traffic forwarding module transmits the data according to the grant, which specifies a transmission window on the optical line during which only the ONU can transmit data to the OLT.

12. The network element of claim 9, wherein the alternate connection module is a wireless connection module.

13. The network element of claim 9, wherein the traffic forwarding module transmits received data to the OLT through the AG-ONU in response to a failure of the optical line to the OLT.

14. A network element implementing an optical line terminal (OLT) that is configured to improve efficiency in a passive optical network (PON), the OLT connected to an optical network unit (ONU) over an optical line, the ONU connected with an aggregating ONU (AG-ONU) in the PON through an alternate connection separate from the PON, the ONU improving cost and energy efficiency for the PON by entering a sleep mode that disables communication with the OLT to reduce energy consumption when the ONU is idle, the OLT to restart communication with the ONU over the optical line upon receipt of data traffic for the ONU, the OLT comprising:
  an ingress module (303) coupled to the optical line, the ingress module configured to receive data from the ONU over the optical line;
  an egress module (305) coupled to the optical line, the egress module configured to transmit data to the ONU over the optical line;

a network processor (307) communicatively coupled to the ingress module and the egress module, the network processor configured to execute a quality of service module, an AG-ONU monitor module, a traffic forwarding module and an ONU management module, the quality of service module (309) configured to check whether the received data traffic for the ONU has a high priority and low bandwidth requirement, the AG-ONU monitor module (311) configured to check whether the alternate connection can service the received data traffic for the ONU having the high priority and low bandwidth requirement, the traffic forwarding module (317) configured to process the received data traffic having the high priority and low data bandwidth requirement that can be serviced by the alternate connection by transmitting the received data traffic for the ONU to the AG-ONU over the PON to be forwarded to the ONU over the alternate connection, configured to process the received data traffic having a low priority or high data bandwidth requirement by transmitting a control packet to the AG-ONU via the PON to be forwarded by the AG-ONU to the ONU over the alternate connection and transmitting the data traffic for the ONU to the ONU over the optical line, the ONU management module (315) configured to detect that the ONU has switched to an active mode from the sleep mode and is able to receive the received data traffic from the OLT over the optical line.

15. The network element of claim 14, wherein the AG-ONU monitor module is configured to receive a status of the alternate connection periodically from the AG-ONU.

16. The network element of claim 14, wherein the ONU management module is configured to provide the grant to the ONU, which specifies a transmission window on the optical line during which the only the ONU can transmit data to the OLT.

17. The network element of claim 14, wherein the traffic forwarding module transmits received data to the ONU through the AG-ONU in response to a failure of the optical line to the ONU.

* * * * *